US008729729B2

(12) United States Patent
Fridberg

(10) Patent No.: US 8,729,729 B2
(45) Date of Patent: May 20, 2014

(54) METHOD AND APPARATUS FOR DRIVING LOW-POWER LOADS FROM AC SOURCES

(76) Inventor: Mikhail Fridberg, Sharon, MA (US)

( * ) Notice: Subject to any disclaimer, the term of this patent is extended or adjusted under 35 U.S.C. 154(b) by 302 days.

(21) Appl. No.: 12/818,295

(22) Filed: Jun. 18, 2010

(65) Prior Publication Data

US 2010/0320840 A1 Dec. 23, 2010

Related U.S. Application Data

(60) Provisional application No. 61/218,115, filed on Jun. 18, 2009.

(51) Int. Cl.
| H02J 1/10 | (2006.01) |
| H02J 3/38 | (2006.01) |
| H02J 1/00 | (2006.01) |
| H05B 35/00 | (2006.01) |

(52) U.S. Cl.
CPC .. *H02J 1/00* (2013.01); *H05B 35/00* (2013.01)
USPC ............. 307/52; 307/125; 315/194; 315/291; 315/295; 315/307

(58) Field of Classification Search
CPC ........................................................ H02J 1/00
USPC ........ 307/52, 125; 315/194, 291, 200 R, 246, 315/247, 307, 308
See application file for complete search history.

(56) References Cited

U.S. PATENT DOCUMENTS

| 8,125,805 | B1 * | 2/2012 | Melanson | 363/89 |
| 8,198,874 | B2 * | 6/2012 | Melanson | 323/222 |
| 2006/0196757 | A1 * | 9/2006 | Choi | 200/50.38 |
| 2007/0182338 | A1 * | 8/2007 | Shteynberg et al. | 315/200 R |
| 2007/0182347 | A1 * | 8/2007 | Shteynberg et al. | 315/312 |
| 2008/0002441 | A1 * | 1/2008 | Allinder | 363/21.14 |
| 2009/0085501 | A1 * | 4/2009 | Cross | 315/307 |
| 2010/0213859 | A1 * | 8/2010 | Shteynberg et al. | 315/224 |

* cited by examiner

*Primary Examiner* — Stephen W Jackson
*Assistant Examiner* — Toan Vu

(57) ABSTRACT

Method and apparatus for providing controllable power to the load via AC-line power source where load is less than minimal required for proper operation of said source. In one example LED lamp connected to AC power source via conventional triac-based dimmer uses less power than minimum required for proper operation of said dimmer. In another example LED lamp connected to AC power source via device known as electronic transformer uses less power than required for proper operation of said electronic transformer.

30 Claims, 11 Drawing Sheets

US 8,729,729 B2

METHOD AND APPARATUS FOR DRIVING LOW-POWER LOADS FROM AC SOURCES

REFERENCE TO RELATED APPLICATIONS

This application claims one or more inventions which were disclosed in Provisional Application No. 61/218,115, filed Jun. 18, 2009, entitled "Method and Apparatus that Allows Driving of Low-Power Loads from AC Sources with High Minimum Power Requirements". The benefit under 35 USC §119(e) of the United States provisional application is hereby claimed, and the aforementioned application is hereby incorporated herein by reference.

BACKGROUND OF THE INVENTION

1. Field of the Invention

The present invention is a directed to methods and apparatus for providing power to devices on AC power lines. More particularly, the invention relates to methods and apparatus for providing power from AC lines to lighting devices. More particularly, the invention relates to methods and apparatus for providing power from AC lines controlled by dimmer circuits or electronics transformers to low-power lighting devices, such as LED lamps.

2. Description of Related Art

There are many lighting applications where amount of light is adjusted via a user-operated device, commonly known as a "dimmer". Conventional AC dimmers reduce AC line voltage to a smaller amount by various methods. Commonly dimming is implemented by removing parts of the AC waveform. Perhaps the most commonly used dimmers, known as "leading-edge" dimmers, employ bidirectional triode thyristors or "triacs" to adjust turn-on time, producing an AC waveform with "chopped-off" leading parts. Triacs function as electronic switches which start to conduct when an appropriate voltage pulse is applied to its gate input, provided current that starts to flow through it is larger than a limit known as "latching current" ($I_L$). Once a triac is conducting it will continue to conduct until current that flows through it drops below a current limit known as "holding current" ($I_H$). Once that happens, the triac will stop conducting.

This technique requires a minimal load that will require currents larger than the latching and holding currents. Many commercially available and installed dimmers of this type require at least a 15 W load on a 110VAC line to work properly. If the load drops below that level the dimmer will not provide smooth dimming, but will instead exhibit such behavior as flickering, audible buzzing, abrupt intensity changes and reduced dimming range.

Triac dimmers are designed to be used with incandescent light bulbs, where 20 W is generally the minimal expected load.

LED lighting is an emerging energy-efficient illumination method. A primary advantage of LED lamps is their power efficiency—the usual LED lamp consumes 3 W to 6 W, with the majority of them consuming less than 10 W. This power consumption is below the 15 W required for normal operation of a triac-based dimmer. It is very desirable to be able to use new LED lamps in existing installations that are controlled by triac dimmers.

Another similar application is the replacement of halogen lamps with LED lamps. Halogen lamps usually require 12V to operate—which could be 12VDC or 12VAC. A common power source is 12VAC generated from the mains by means of a device known as an "electronic transformer". This device generates 12VAC at a frequency in the range of 20 kHz-60 kHz. Electronic transformers usually require 10 W-30 W minimum load to operate properly. LED lamps are an excellent energy-efficient substitute for such halogen lamps but their power is usually less than the minimum required by an electronic transformer.

Common methods of dealing with these problems involve requiring usage of more than a single LED lamp to increase total power load, or to increase power consumption of the LED driver, wasting energy and generating extra heat. There is great interest in creating drop-in low-power LED lamp replacements which could be used instead of incandescent or halogen light bulbs in a manner completely transparent to the user.

FIG. 1 is a block-diagram of a conventional method of driving an incandescent light bulb using triac dimmer 10. Input sinusoidal AC voltage 16 (shown on FIG. 3) is charging capacitor 13 through variable resistor 12. After voltage across capacitor 13 exceeds breakdown voltage of diac 14, a pulse will be generated which will be applied to gate of triac 11. This in turn will turn triac 11 on and it will start conducting current, which will flow through incandescent light bulb 20. If that current exceeds a latching current limit it will continue to flow for the rest of a half-period of the AC waveform until it drops below holding current levels. At the same time capacitor 13 will discharge through diac 14 and triac 11 and will be ready to generate another pulse on the next half-period of the AC waveform.

The moment when a gate pulse is generated is defined by the resistance of variable resistor 12 and the capacitance of capacitor 13. Users can change that time, known as phase angle, by adjusting resistance of variable resistor 12.

FIG. 3 illustrates the 110V AC waveform at point 16 (on the input of dimmer 10), common in the USA.

FIG. 4 illustrates one possible waveform on the output of dimmer 10 at point 15, when resistance of variable resistor 12 is set to minimum. The beginning of each half-period is removed because setting the phase angle to start earlier might cause firing when current through triac 11 is less than latching current. This is the same waveform that is being applied to light bulb 20 through wires 17.

FIG. 5 illustrates another possible waveform with phase angle set to approximately 70 degrees.

FIG. 6 illustrates another possible waveform with minimum phase angle when the load is too small for triac 11 to work properly. Even though phase angle is set to minimum, the triac behaves like its phase angle is set to approximately 45 degrees.

FIG. 7 illustrates another possible waveform with phase angle set to 70 degrees, when the load is too small for triac 11 to work properly. In this situation triac 11 is not turning on at all.

FIG. 2 shows one prior art method of driving an LED lamp with a dimmer.

The AC output 41 of dimmer 10 is fed through wires 40 to full-wave rectifier 31. The rectified signal 42 from rectifier 31 is filtered by inductor 33 and capacitor 34. That signal 42 provides power to LED driver 32, which in turn generates voltage to drive LED light 50, which can be a single LED or a plurality of high-brightness LEDs. In order to maintain current through the triac 11 in dimmer 10 above latching and holding levels, bleeder resistors 35 and 37 are employed, together with switch 36.

LED driver 32, using the dimmer voltage 41, measured through path 39, to maintain necessary holding current, will temporary add load resistor 35 through switch 36 controlled by signal 38 when required. Bleeder resistors 35 and 37 are used every half-waveform and they increase power consumption of LED light 50 to levels where dimmer 10 can operate normally. This method artificially lowers efficiency of LED light system by increasing its power consumption, and thereby destroys one of the major advantages LED light has over incandescent lamps.

SUMMARY OF THE INVENTION

The invention provides a driver for driving low power loads from an AC source such as a triac dimmer, electronic transformer or similar source, where the load is less than the minimum usually required for such a source.

The driver drives the load with a current source which is supplied with energy from a capacitor. The energy in the capacitor is supplied through a switch, controlled by an intelligent controller which will close the switch for a number of periods of AC line voltage when the capacitor voltage drops below a predetermined limit based on the amount of current needed to charge the capacitor. The time may be determined asynchronously or synchronously.

Another function of the intelligent controller is to determine the amount of dimming that is demanded by a user by determining the fraction of the AC waveform that is being cut-off by the power source. Based on that information the intelligent controller can send a control command to the current controller to dim the output from the load.

A principal advantage of the present invention is that it allows direct substitution of existing high-power incandescent and halogen lighting with very low-power LED lamps on existing circuits with minimal power requirement.

DETAILED DESCRIPTION OF THE INVENTION

The invention provides a method of driving a load from a dimmer or other power source of the sort described above which requires a minimum power draw to operate properly, where the power requirements of the load might be too low to provide the required draw. Instead of trying to draw constant (and low) power from the AC power source, the driver of the invention draws power in portions of a few pulses of high power followed by a few pulses of no power—"pulse skipping"—which results in sufficient peak power draw to allow the power source to operate. The energy from the pulses of high power are stored in an intermediate storage element—a capacitor—so that the load, such as an LED light, receives the power it needs without being pulsed.

Figure 12:
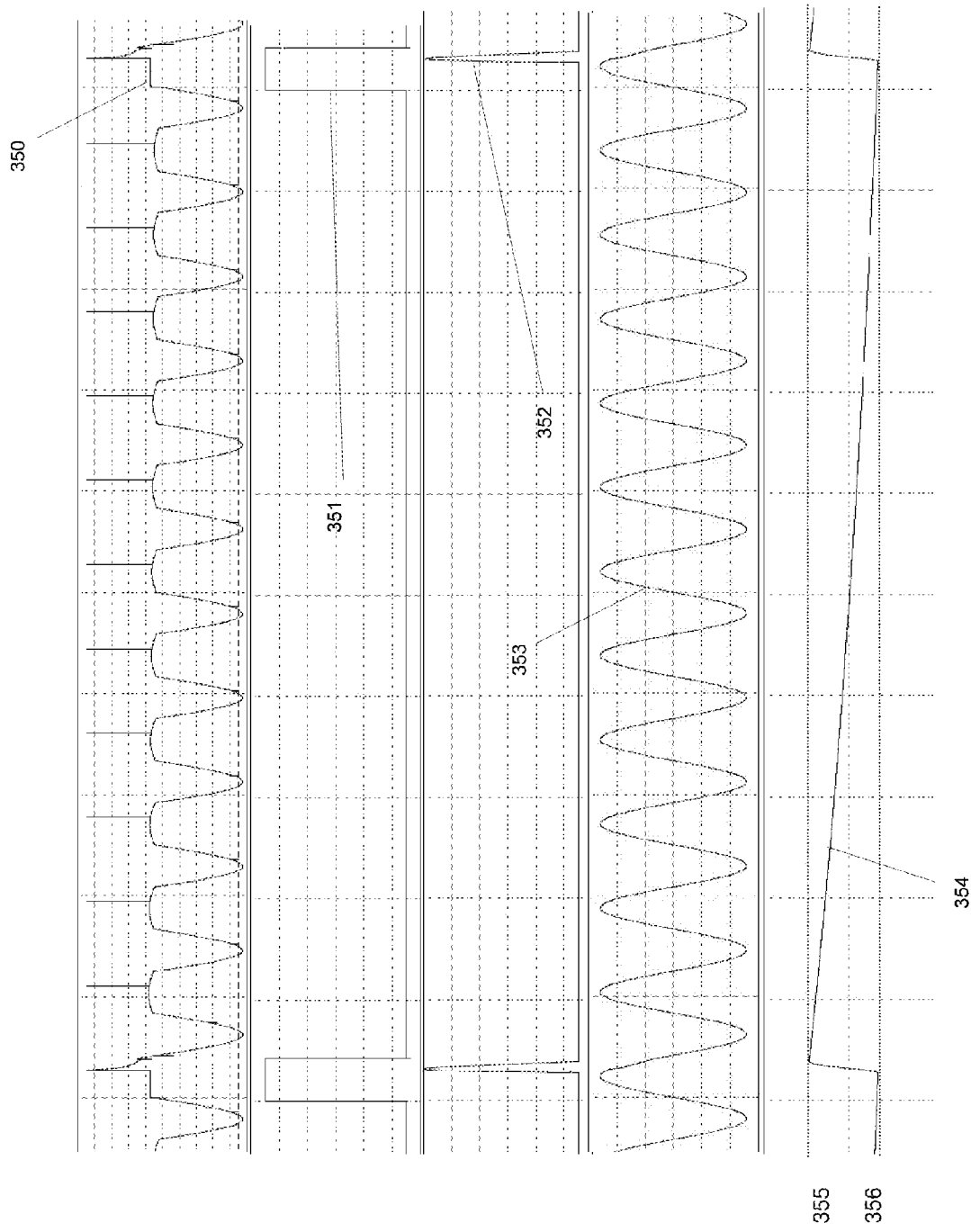
FIG. 12 shows waveforms at different points of the embodiment of the invention shown in FIG. 8.
Figure 13:
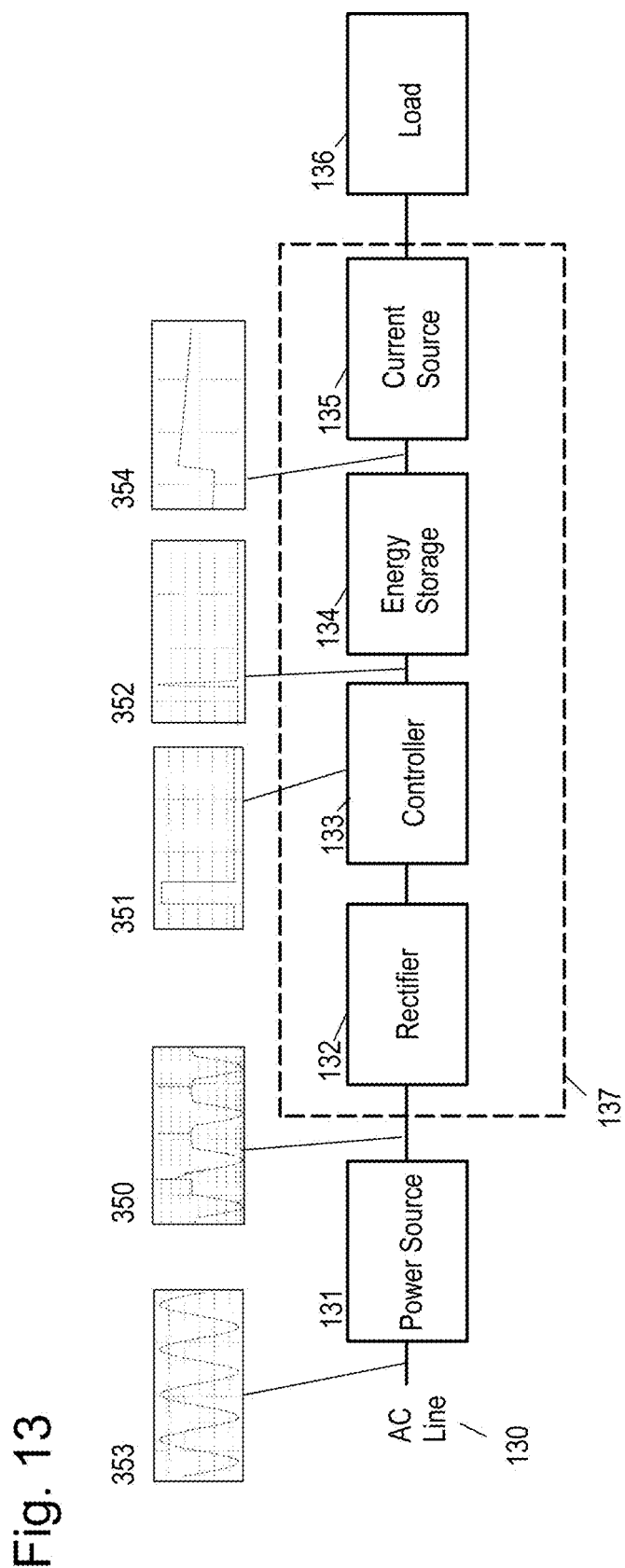
FIG. 13 shows an overall block diagram of the invention.

FIG. 13 shows an overall block diagram of the invention, annotated with portions of the waveforms from FIG. 12. The system and method of the invention are used to drive a low-power load 136 from a dimmer or other power source 131 fed by the AC line 130. The low-power load 136 can be an LED light, or some other load, which may not provide a sufficient power draw to properly operate the power source 131.

As can be seen in FIG. 13, the AC line 130 has a sinusoidal AC voltage 353, typically 120V at 60 Hertz in the USA, or 220V at 50 Hertz in Europe. The AC line 130 feeds a power source 131, such as a triac dimmer or electronic transformer or other source as discussed in the background section above. The AC line voltage and current and power source design are prior art, and do not form part of the invention. The output of the power source 131 is a modified AC signal 350, which varies based on a user's selection of dimming level of the load 136 or other factors.

The driver 137 takes the modified AC signal 350 from the power source 131 and feeds the load 136 with a current sufficient for the load which is preferably not pulsed or otherwise intermittent.

The driver 137 has a rectifier 132 which rectifies the modified AC signal 350 into pulsating DC. The waveforms shown in FIGS. 12 and 13 are for a half-wave rectifier, but it will be understood as explained below that a full-wave rectifier could also be used within the teachings of the invention.

A controller 133 takes the pulsating DC signal from the rectifier 132 and gates the signal with a switching control signal 351, so as to allow the pulsating DC signal to pass only during the gate (switch closed) period and skipping all pulses outside the gate period, providing an output waveform 352 of separated pulses.

These pulses draw full power from the power source 131 during the gate period, and the frequency and length of that period is chosen at a minimum to draw sufficient power over time so that the power source can operate properly. While waveform 352 is shown in FIGS. 12 and 13 to have only one DC pulse at a time, it will be understood that longer gate periods will allow more than one pulse to pass during the gate period. The method of determining the gate or switch closure period is discussed in more detail in the discussions of the embodiments of FIGS. 8 through 11 below.

The pulsating DC output 352 of the controller 133 is used to charge an energy storage device 134, typically a capacitor. As shown in waveform 354, the energy storage device 134 stores energy (that is, it charges) from the DC pulses during the gate period, and releases energy (discharges) through current source 135, which feeds the load 136.

The gate period of the controller 133 is also controlled by a lower limit or threshold 356 on the charge state (voltage 354) of the energy storage device 134, so that device always has sufficient energy to feed the load 136 through current source 135. Because the voltage 354 on the energy storage device 134 is not allowed to fall below a threshold necessary to feed the current source 135, the current feeding the load 136 is therefore continuous and the load does not see a pulsating voltage which might cause a lamp to flicker or blink.

Thus, the gate period of the controller 133 is triggered often enough (i.e. at a high enough frequency) to keep the power source 131 operating properly, and the gate period duration is set at a value which is, at minimum, determined by the power draw requirements of power source 131 (or a chosen time which will accommodate a number different kinds of such sources), and the period is lengthened dynamically for a charge time period based on the requirements of the load 136 as reflected in the charge state of the energy storage device 134.

Figure 8:
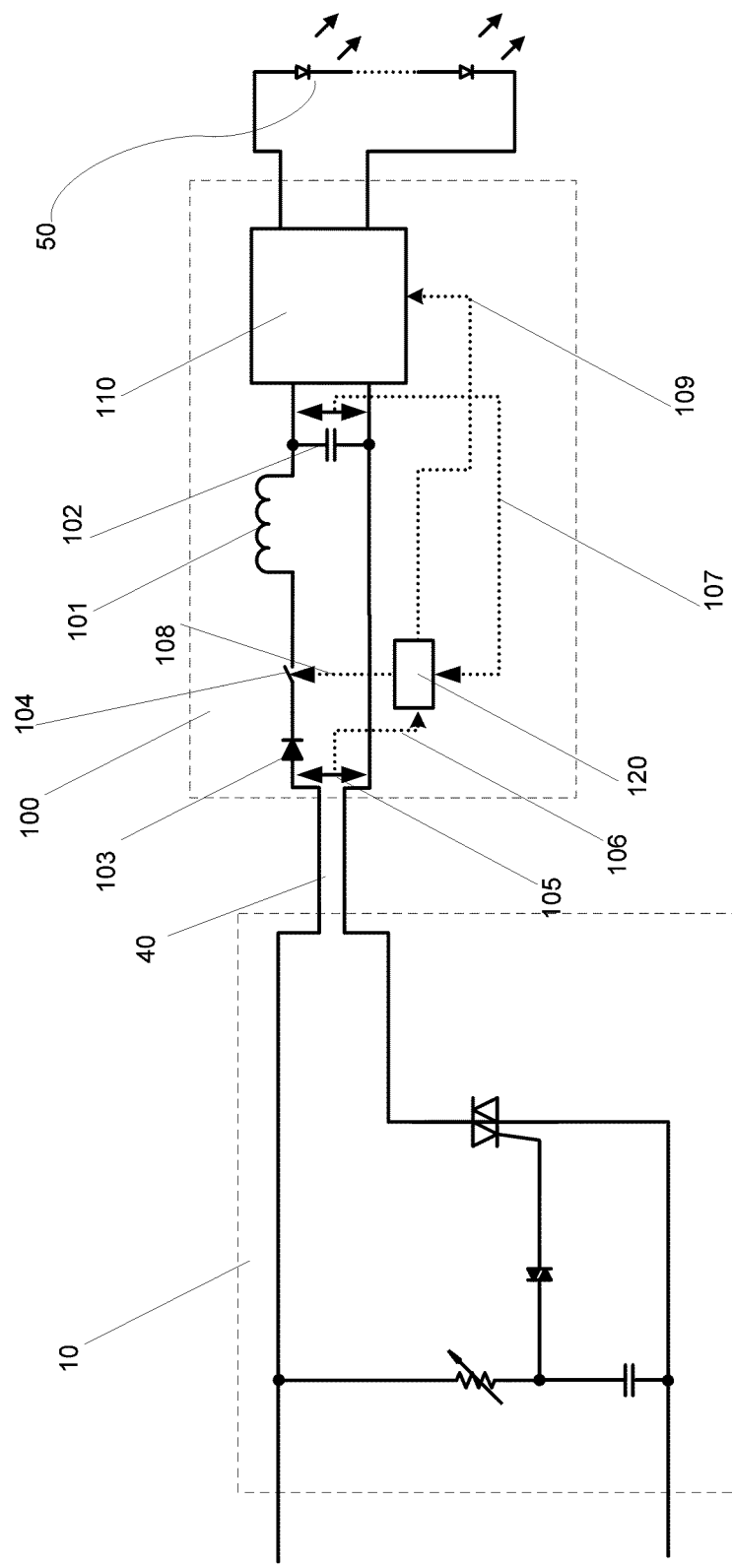
FIG. 8 is a circuit block diagram of one embodiment of the current invention.

FIG. 8 shows a first embodiment of the invention, in which there is shown a driver 100 that is driving a load, shown as LED lamps 50. Driver 100 receives its power from triac-controlled dimmer 10 through wires 40.

Figure 1:
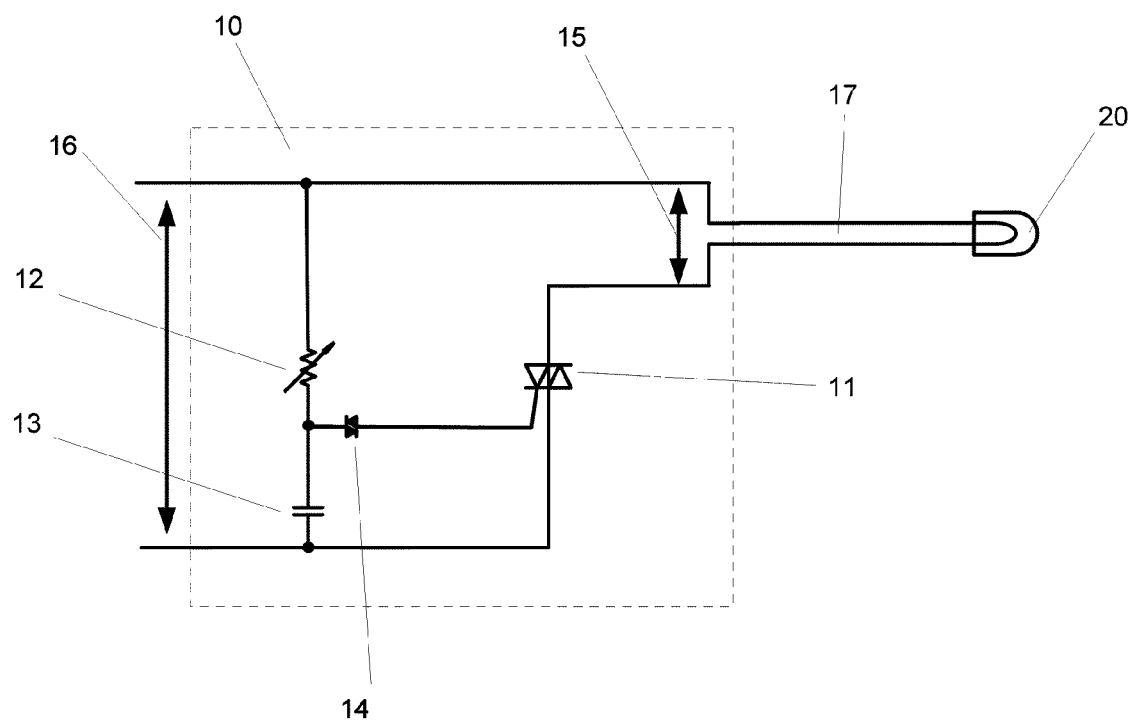
FIG. 1 (PRIOR ART) is a circuit block diagram of one common triac dimmer controlling an incandescent light bulb.
Figure 2:
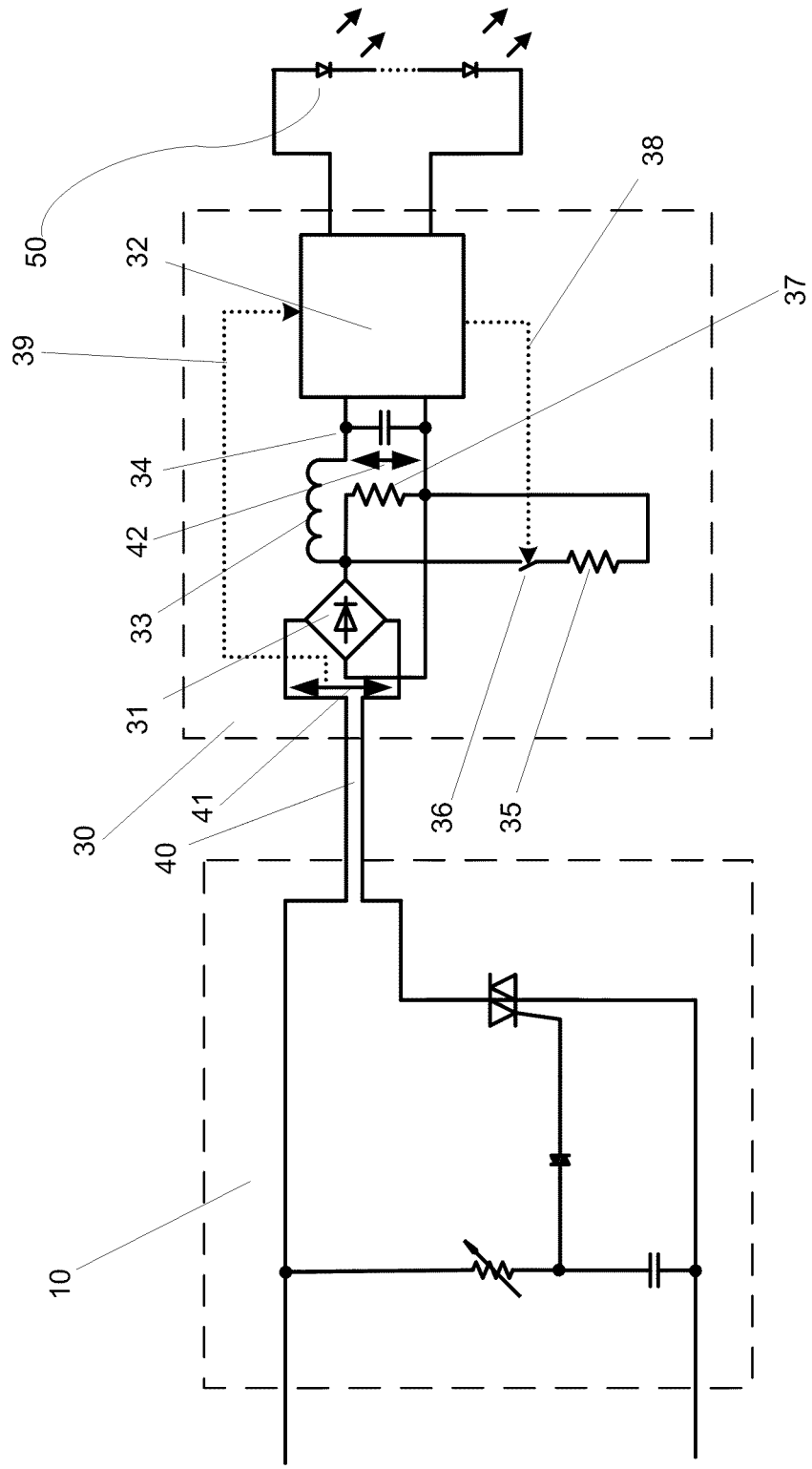
FIG. 2 (PRIOR ART) is a circuit block diagram of one current method of controlling an LED light bulb connected to a triac dimmer.
Figure 3:
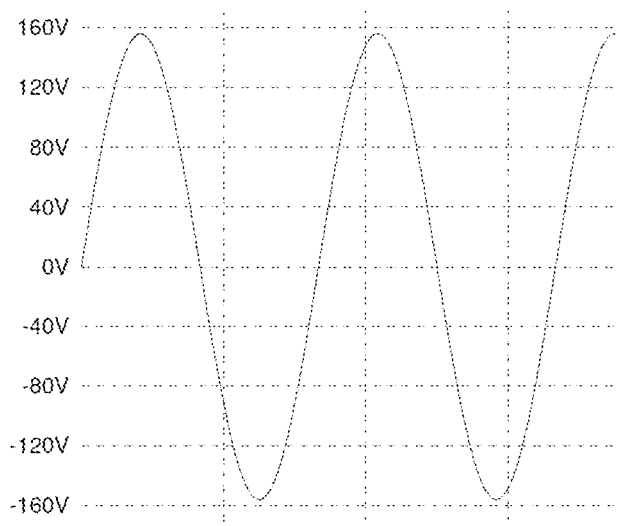
FIG. 3 shows the voltage waveform on a common 110V AC line.
Figure 4:
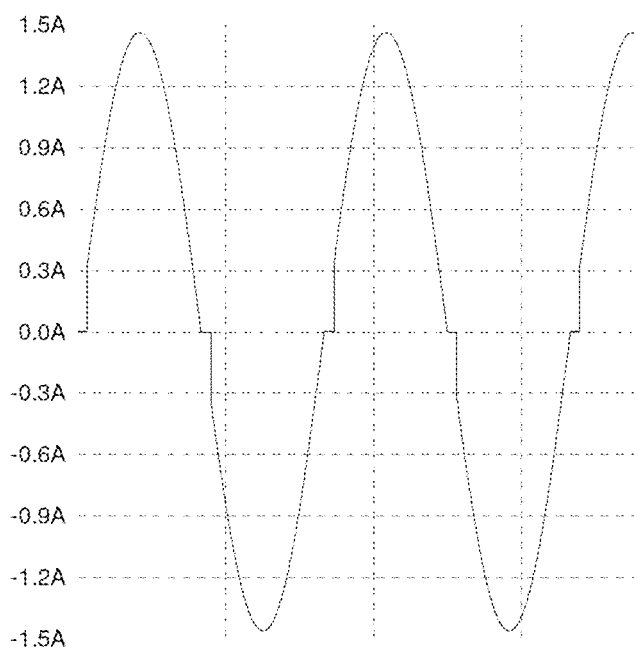
FIG. 4 shows the voltage waveform on the output of a triac dimmer set to maximum power during normal operation.
Figure 5:
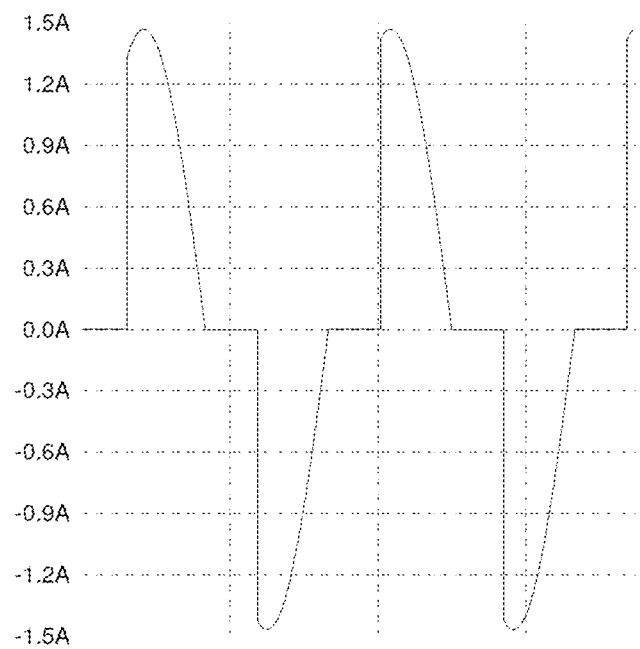
FIG. 5 shows the voltage waveform on the output of a triac dimmer set to approximately 40% of maximum power during normal operation.
Figure 6:
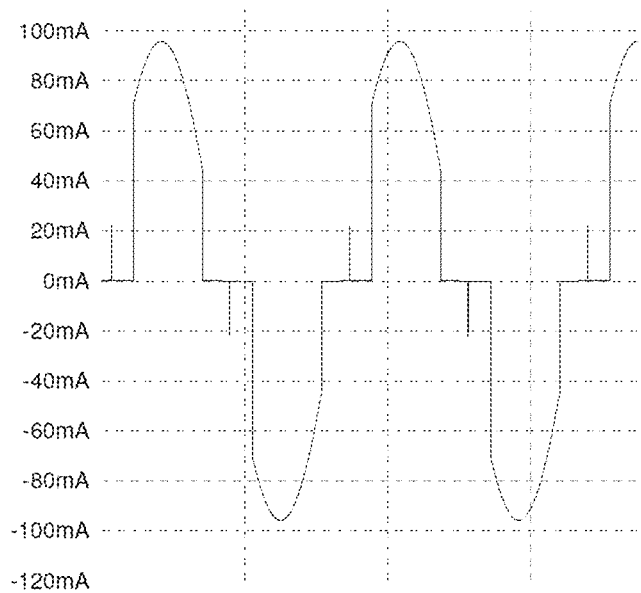
FIG. 6 shows the voltage waveform on the output of a triac dimmer set to maximum power with a load significantly below the minimum required.
Figure 7:
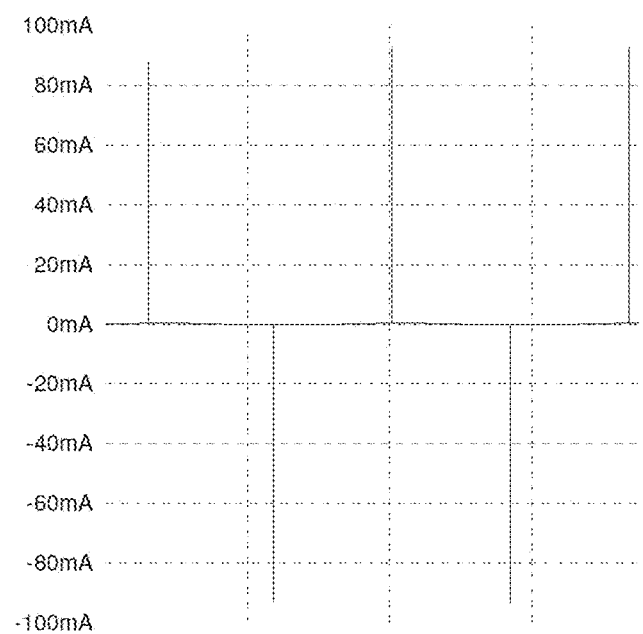
FIG. 7 shows the voltage waveform on the output of a triac dimmer set to approximately 40% of maximum power with a load significantly below the minimum required.
Figure 9:
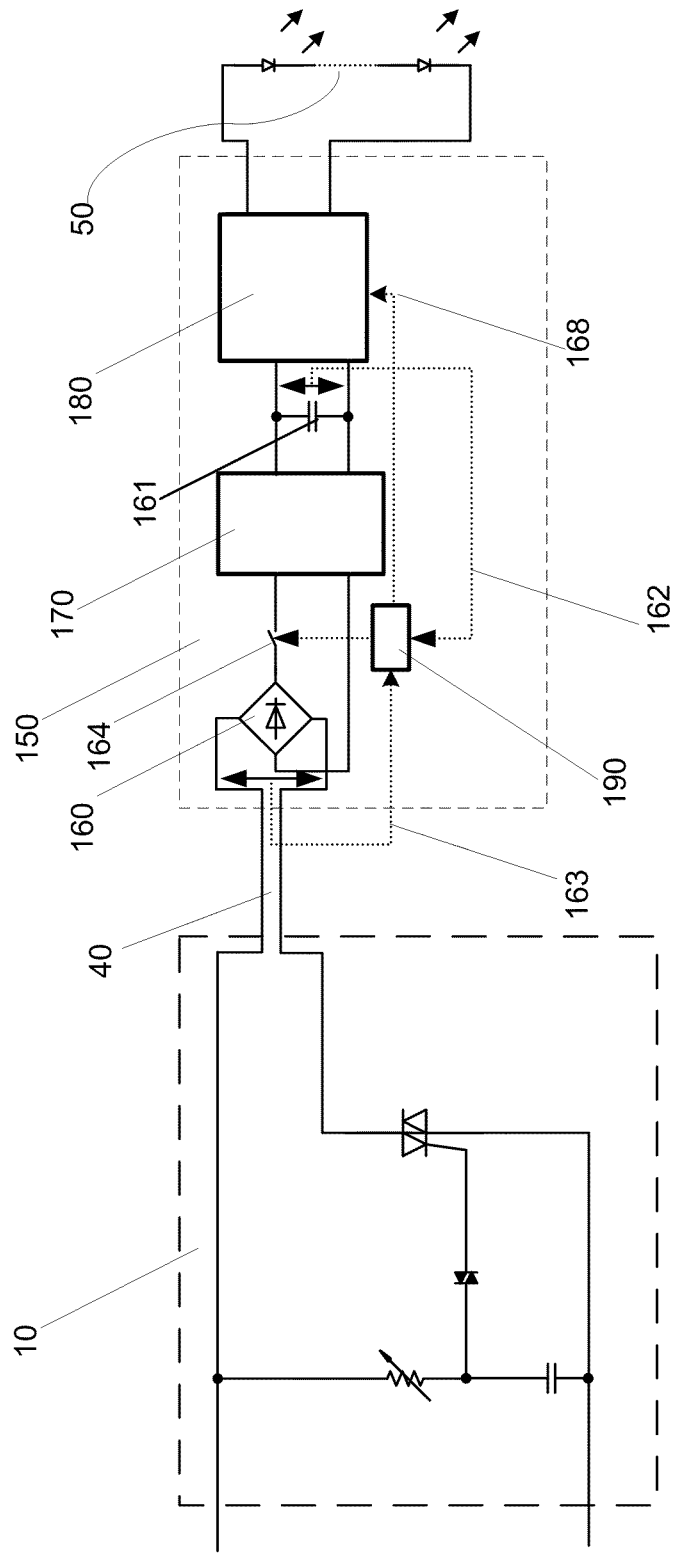
FIG. 9 is a circuit block diagram of another embodiment of the present invention.
Figure 10:
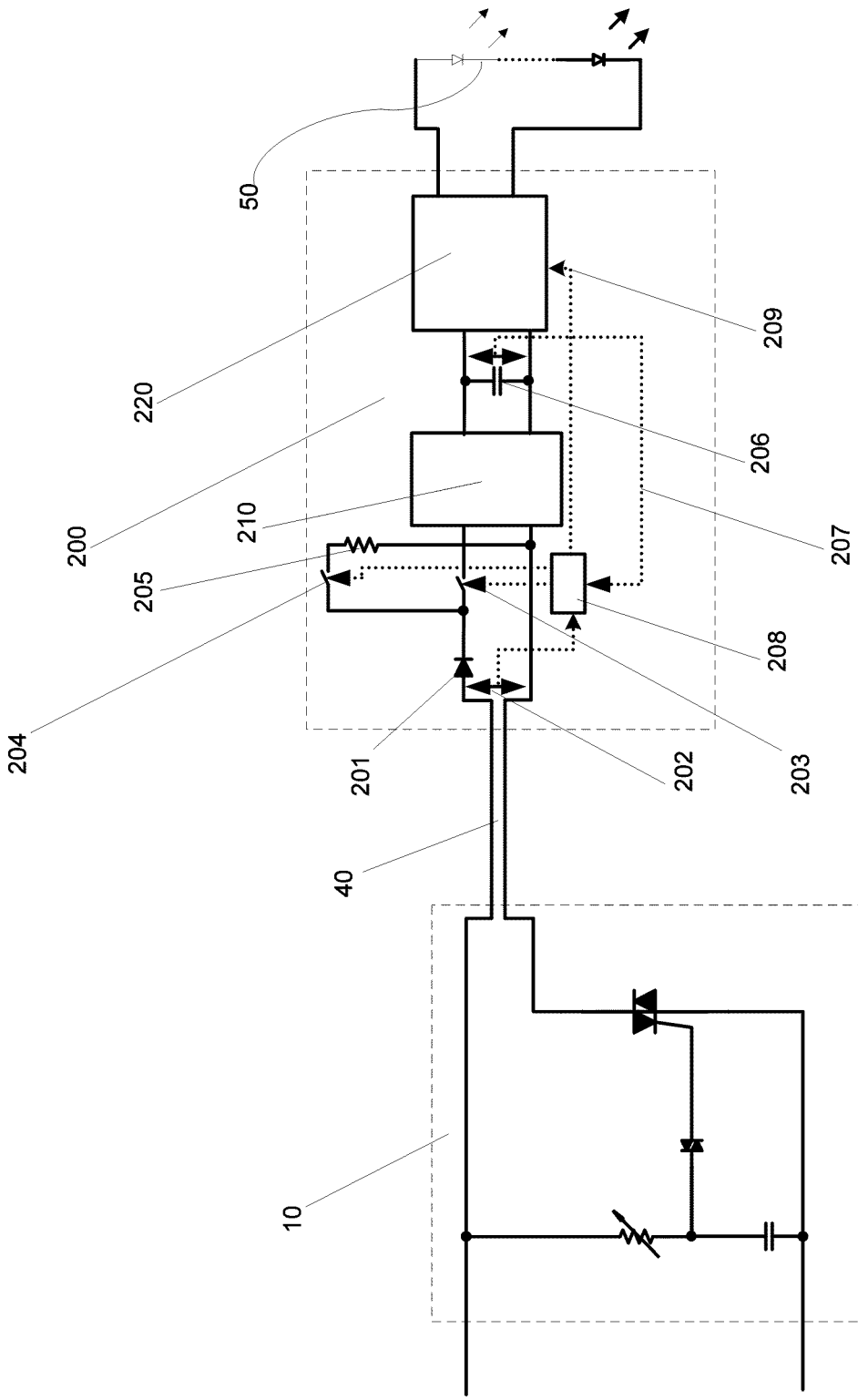
FIG. 10 is a circuit block diagram of another embodiment of the present invention.
Figure 11:
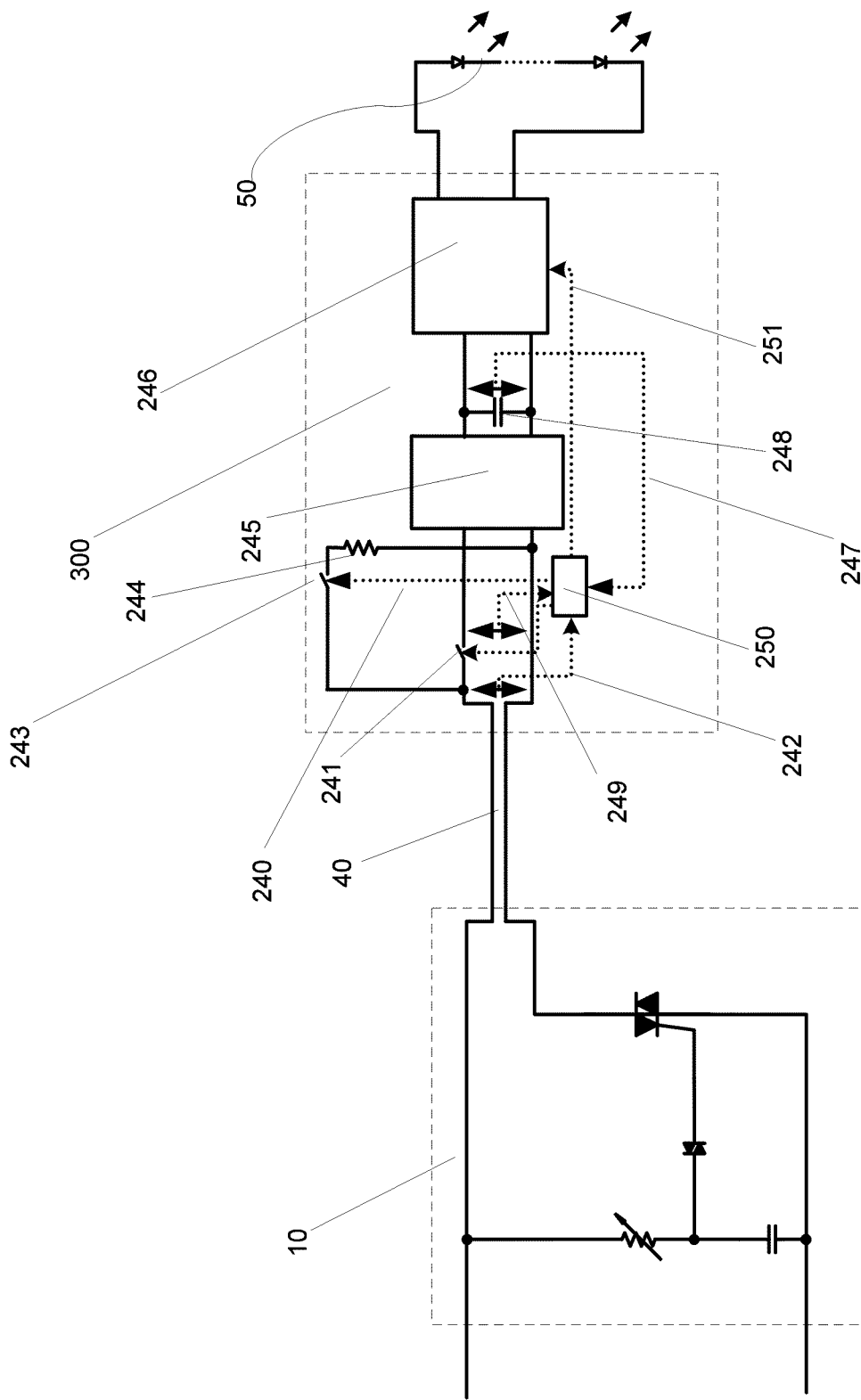
FIG. 11 is a circuit block diagram of another embodiment of the present invention.

While dimmer 10 is shown in this figure and following FIGS. 9 through 11 as the triac dimmer shown in prior art FIG. 1 and discussed above, it will be understood by one skilled in the art that other designs of power sources such as dimmers and electronic transformers and other power sources can be used within the teachings of the invention where low-power loads consume less power than is required for normal operation of the power source without sacrificing performance and efficiency.

In more detail, still referring to FIG. 8, LED driver 100 consists of current source 110 that receives its power from capacitor 102. The capacitor 102 is charged by pulsed DC voltage from half-wave rectifier 103 via inductor 101 during the time when switch 104 is closed by a signal on control input 108. The capacitor 102 will supply power to LED current driver 110 during the time when switch 104 is open. The timing of the switch 104 is determined by intelligent controller 120, based on voltage 105 through line 106 on the input of the driver 100 and voltage 107 across capacitor 102.

Switch 104 can be any sort of electronically-controllable switch known to the art which is capable of switching from an open to closed state in response to a control signal on an input in a chosen fraction of a cycle of the AC input voltage 105. The specific type of switch chosen for a given application would be within the design ability of one skilled in the art.

The timing of switch 104 is selected to be such as to periodically draw enough current from the dimmer 10 for it to operate normally. Depending on the power draw of LED lamp 50 and driver 110, switch 104 will be closed for some fraction of the time. In simplified form, if the minimum required power to operate dimmer 10 is 15 W, and LED lamp 50 only draws 5 W, the switch 104 will be closed ⅓ of the time, maintaining power draw of 15 W during the time when it is closed and 0 W when it is open.

Those skilled in the art will understand that intelligent switch controller 120 will "skip" a number of AC line pulses between closures of switch 104. The number of pulses to skip will depend on the minimum required power for proper operation of triac dimmer 10, which will be chosen to support a number of dimmers. The intelligent switch controller will thus close the switch 104 sufficiently often to keep the dimmer 10 operating properly, or, put another way, will skip only so many pulses as it can before the dimmer 10 cannot operate properly.

The timing of switch 104 could also be determined based on, and the amount of energy remaining in capacitor 102, which can be calculated by measuring its voltage 107. Controller 120 will close switch 104 for a number of periods of AC line voltage when voltage 107 across capacitor 102 drops below a selected lower limit (356 in FIG. 12). That limit is determined based on the amount of current needed to feed the current source 109—that is, the threshold or lower limit voltage should not be so low that current source 109 cannot feed the load 50. When controller 120 calculates that the voltage has dropped to the lower limit or threshold voltage, it will close the switch. The switch 104 closure or gate period can be, for example, 1.5 times a single period of line AC voltage. This method allows asynchronous operation without actually knowing the exact phase of AC line voltage, which is difficult to know when switch 104 is open.

Another method of determining the time required to keep switch 104 closed is by means of a phase-locked loop that is used to detect and maintain phase information of the AC line voltage. In this case controller 120 will be able to close switch 104 synchronously with AC line voltage.

Another function of intelligent switch controller 120 is to determine the amount of dimming that is demanded by a user. By either analyzing a shape of the signal at 105 or by simply filtering it with a low-pass filter and measuring the resulting voltage it is possible to determine the fraction of the AC waveform that is being cut-off by the dimmer 10. Based on that information intelligent controller 120 can send a control command via line shown as 109 to LED current controller 110 to dim output from LED lamp 50.

FIG. 12 illustrates waveforms at different points of invention described on FIG. 8. In this figure the dimmer 10 is set to a large phase angle for illustrative purposes. Only a fraction of the 110VAC voltage is going through the dimmer 10.

Sinusoidal 110VAC line voltage on the input of dimmer 10 is shown as waveform 353. The signal at the control input of switch 104 which causes the switch to close is shown as waveform 351. Input voltage 105 is shown as waveform 350, and current through diode 103 is shown as 352. Voltage 107 across capacitor 102 is shown as waveform 354, with line 356 marking the lower limit or threshold of capacitor voltage, at which the controller will close the switch, and line 355 marking the upper limit or threshold voltage to which the capacitor is allowed to charge during the switch closure period.

Those skilled in the art will understand that a certain number of AC line pulses are being skipped and only a small number of them are being used, but those that are used are being used at their normal power, thereby allowing dimmer to work properly. The particular number of skipped pulses is shown for illustrative purposes only.

The construction details of the invention as shown in FIG. 8 are that intelligent controller 120 uses a microprocessor or digital signal processor with sufficient processing power to determine the period and time to close the switch 104. It also uses an analog to digital converter, either built-in or external, to sample voltages 105 and 107, and based on its knowledge of power consumption by lamp 50 and capacitor 102 calculates all the necessary information to decide when to close switch 104 and for how long. In the particular embodiment of FIG. 8, intelligent power controller 120 will keep switch 104 open thereby skipping AC pulses until voltage across capacitor 102 falls below a lower threshold 356 and then close switch 104 until voltage across capacitor 102 exceeds another threshold 355.

FIG. 9 shows another embodiment of the invention. The voltage from dimmer 10, input on wires 40 to driver 150 as in the previous figure, is rectified by full-wave rectifier 160. Rectified AC voltage from the rectifier 160 is controlled by switch 164 and is fed to active power factor controller 170. Power factor controller 170 will charge capacitor 161 in a way as to maintain input current as a proportion of input voltage 163 when switch 164 is closed. Capacitor 161 is used as an energy storage element and it supplies energy to current driver 180 during the time when switch 164 is open.

In more detail, still referring to invention of FIG. 9, current driver 180 provides current sufficient to drive LED lamp 50 with sufficient power using energy stored in capacitor 161. Intelligent switch controller 190 determines when to close switch 164 and for how long by sampling input voltage 163 and voltage 162 across capacitor 161. Intelligent switch controller 190 uses microprocessor or digital signal processor with sufficient processing power to determine the period and time to close switch 164 at specific intervals so power draw from dimmer 10 is above its minimum required power draw. The controller 190 uses an analog to digital converter, either built-in or external, to sample input voltage 163 and capacitor 161 voltage 162, and based on its knowledge of power consumption by lamp 50 and capacitance of capacitor 161, calculates all necessary information to decide when to close switch 164 and for how long.

Those skilled in the art will understand that intelligent switch controller 190 will "skip" a number of AC line pulses between closures of switch 164. The number of pulses to skip will depend on minimum required power for proper operation of triac dimmer 10 which will be chosen to support a number of dimmers, and the amount of energy remaining in capacitor 161, which will be calculated by measuring its voltage 162.

In further detail, still referring to invention of FIG. 9, when controller 190 determines that energy stored in capacitor 161 has dropped below a predetermined limit it will close switch 164 asynchronously or synchronously with AC line voltage. In an asynchronous technique the switch will be closed for 1.5 periods of AC line voltage, while in synchronous technique it will be closed for 0.5 periods. Synchronous technique requires a phase-locked loop or similar method to detect AC line voltage phase during infrequent closure of switch 164.

Power factor controller 170 insures that current drawn from dimmer 10 follows voltage from dimmer 10 and will maintain high power factor values, usually above 0.9. Full-wave rectifier 160 is especially useful with low values of AC line voltage 163.

Another function of intelligent switch controller 120 is to determine amount of dimming that is demanded by a user. By either analyzing a shape of the signal at 163 or by simply filtering it with a low-pass filter and measuring the resulting voltage it is possible to determine the fraction of AC waveform that is being cut-off by the dimmer 10. Based on that information intelligent controller 120 can send a control command via line shown as 168 to LED current controller 180 to dim output from LED lamp 50.

Referring next to FIG. 10 is another embodiment of present invention, where the voltage 202 from dimmer 10 on lines 40 to driver 200 is rectified by half-wave rectifier 201. Rectified AC voltage is controlled by switch 203 and is fed to active power factor controller 210. Power factor controller 210 will charge capacitor 206 in a way as to maintain input current as a proportion of input voltage 202 when switch 203 is closed. Capacitor 206 is used as an energy storage element and it supplies energy to current driver 220 during the time when switch 203 is closed.

Those skilled in the art will understand that intelligent switch controller 208 will "skip" a number of AC line pulses between closures of switch 203. The number of pulses to skip will depend on the minimum required power for proper operation of triac dimmer 10 which will be chosen to support a number of dimmers, and the amount of energy remaining in capacitor 206, which will be calculated by measuring its voltage 207.

In more detail, still referring to invention of FIG. 10, current driver 220 provides current sufficient to drive LED lamp 50 with sufficient power using energy stored in capacitor 206. Intelligent switch controller 208 determines when to close switch 203 and for how long by sampling voltages 202 on the input wires 40 and the voltage 207 across capacitor 206. Switch controller 208 will close the switch 203 specific intervals so power draw from dimmer 10 is above its minimum required power draw.

In further detail, still referring to invention of FIG. 10, when controller 208 determines that energy stored in capacitor 206 has dropped below a specified limit it will close switch 203 asynchronously or synchronously with AC line voltage 202. In an asynchronous technique the switch will be closed for 1.5 periods of AC line voltage, while in synchronous technique it will be closed for 0.5 periods. Synchronous technique requires a phase-locked loop or similar method to detect AC line voltage phase during infrequent closure of switch 203.

Power factor controller 210 will insure that current drawn from dimmer 10 follows voltage 202 from dimmer 10 and will maintain high power factor values, usually above 0.9.

Another function of intelligent switch controller 208 is to determine the amount of dimming that is demanded by a user. By either analyzing the shape of the signal at 202 or by simply filtering it with low-pass filter and measuring resulting voltage it is possible to determine the fraction of the AC waveform that is being cut-off by the dimmer 10. Based on that information, intelligent controller 208 can send a control command via line shown as 209 to LED current controller 220 to dim output from LED lamp 50.

The construction details of the invention as shown in FIG. 10 are that intelligent controller 208 uses a microprocessor or digital signal processor with sufficient processing power to determine the period and time to close the switch 203. It also uses an analog to digital converter, either built-in or external, to sample voltages 202 and 207 and based on its knowledge of power consumption by lamp 50 and capacitance of capacitor 206 to calculate all necessary information to decide when to close switch 203 and for how long.

Intelligent switch controller 208 will be able to test the dimmer 10 by means of switch 204 and load resistor 205. By infrequently closing switch 204 it will force current to be drawn from dimmer 10 into dummy load resistor 205. This allows switch controller 208 to safely detect the phase angle of AC voltage 202 without the use of a phase-locked loop, and to detect dimmer position without disturbing the rest of the system.

Referring next to FIG. 11 is another embodiment of present invention, where AC voltage 242 from dimmer 10 to driver 300 on wires 40 is fed directly to switch 241. Intelligent switch controller 250 together with switch 241 forms a synchronous rectifier of the input AC waveform 242. AC line voltage 242, after rectification in such manner, is fed to active power factor controller 245.

Power factor controller 245 will charge capacitor 248 in a way as to maintain input current as a proportion of input voltage when switch 241 is closed. Capacitor 248 is used as an energy storage element and it supplies energy to current driver 246 during the time when switch 242 is closed.

In more detail, still referring to invention of FIG. 11, current driver 246 provides current sufficient to drive LED lamp 50 with sufficient power using energy stored in capacitor 248. Intelligent switch controller 250 determines when to close switch 241 and for how long by sampling voltage 242 on the input and voltage 247 across capacitor 248.

Switch controller 250 will close the switch 241 at specific intervals so power draw from dimmer 10 is above its minimum required power draw. Those skilled in the art will understand that intelligent switch controller 250 will "skip" number of AC line pulses between closures of switch 241. The number of pulses to skip will depend on the minimum required power for proper operation of triac dimmer 10 which will be chosen to support a number of dimmers, and the amount of energy remaining in capacitor 248, which will be calculated by measuring its voltage 247.

In further detail, still referring to invention of FIG. 11, when intelligent switch controller 250 determines that energy stored in capacitor 248 has dropped below a specified limit it will close switch 241 synchronously with AC line voltage 242 for not more than half of the AC period. Synchronous technique requires a phase-locked loop or similar method to detect AC line voltage 242 phase during infrequent closure of switch 241.

Power factor controller 245 will insure that current drawn from dimmer 10 follows the voltage 242 from dimmer 10 and will maintain high power factor values, usually above 0.9.

Another function of intelligent switch controller 250 is to determine the amount of dimming that is demanded by a user. By either analyzing the shape of the signal at 242 or by simply filtering it with a low-pass filter and measuring the resulting voltage it is possible to determine the fraction of the AC waveform that is being cut-off by dimmer 10. Based on that information intelligent controller 250 can send a control command via line shown as 251 to LED current controller 246 to dim output from LED lamp 50.

The construction details of the invention as shown in FIG. 11 are that intelligent switch controller 250 uses a microprocessor or digital signal processor with sufficient processing power to determine the period and time to close the switch 241. It also uses an analog to digital converter, either built-in or external, to sample voltages 242 and 247 and based on its knowledge of power consumption by lamp 50 and capacitance of capacitor 248 to calculate all necessary information to decide when to close switch 241 and for how long.

Intelligent switch controller 250 is capable of testing the dimmer 10 by means of switch 243 and load resistor 244. By infrequently closing switch 243 through a signal on control input 240 it forces current to flow from dimmer 10 into dummy load resistor 244. This allows intelligent switch controller 250 to safely detect the phase angle of the AC voltage without use of a phase-locked loop and to detect dimmer position without disturbing the rest of the system.

The intelligent switch controller 250 can use high-frequency pulse-width modulation to control current drawn from AC line during the time that capacitor 248 is being charged by monitoring voltages 249 and 247.

The advantages of the present invention include, without limitation, is that it allows use of triac dimmers and electronic transformers as well as other applications with low-power loads where loads consume less power that required for normal operation of abovementioned triac dimmers, electronic transformers and other power sources without sacrificing performance and efficiency.

In broad embodiment, the present invention is a method of using AC power sources with loads that are less than the minimum required by the source. To those skilled in the art it would be clear that this method will also work other devices that have minimal load requirements, including for example such devices as electronic transformers.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiments, methods, and examples, but by all embodiments and methods within the scope and spirit of the invention as claimed.

What is claimed is:

1. A driver for driving a load from an output from an AC source, comprising:
   a) a rectifier having an AC input coupled to the output from the AC source and a rectified DC output;
   b) a current source having an output for driving the load and an input;
   c) an energy storage device for storing energy, coupled to the input of the current source for supplying energy to the current source;
   d) a controller having an input coupled to the DC output of the rectifier and an output coupled to the energy storage device, comprising:
      i) a switch having a control input for controlling an open or closed state of the switch, coupled between the input of the controller and the output of the controller, such that current passes through the controller from the input to the output when a signal at the control input causes the switch to be in the closed state, storing energy in the energy storage device; and
      ii) an intelligent controller having an output coupled to the control input of the switch, and a voltage sensing input coupled to the energy storage device;
   the intelligent controller being programmed to close the switch at a frequency sufficient for the AC source to operate properly, and maintaining the switch closed for a gate period chosen between: i) a minimum gate period chosen to provide a minimum required power draw for operation of the AC source; and ii) a second gate period, longer than the minimum gate period; the intelligent controller being programmed to choose the second gate period during a charge time period starting when a charge state of the energy storage device as sensed by the voltage sensing input drops below a lower limit.

2. The driver of claim 1, in which the charge time period is terminated when the charge state of the energy storage device as sensed by the voltage sensing input exceeds an upper limit.

3. The driver of claim 1 in which the gate period is determined asynchronously.

4. The driver of claim 1, in which the intelligent controller further comprises a phase-locked loop locked to a frequency of the AC input voltage, and the gate period is synchronously based on the phase-locked loop.

5. The driver of claim 1, further comprising an inductor coupled between the DC output of the rectifier and the input of the current source.

6. The driver of claim 1, in which the intelligent controller further comprises a dimmer control output and the current source further comprises a control input, and the intelligent controller is programmed to determine an amount of dimming that is demanded by a user by determining a fraction of the AC input that is being cut-off by the power source and sending a control command on the dimmer control output to the control input of the current source to dim the output to the load.

7. The driver of claim 1, further comprising an active power factor controller coupled between the DC output of the rectifier and the input of the current source.

8. The driver of claim 1, in which the rectifier is a full-wave rectifier.

9. The driver of claim 1, further comprising a load resistor in series with a test switch having a control input, the resistor and switch being coupled across the DC output of the rectifier, and in which the intelligent controller further comprises a test output coupled to the control input of the test switch, such that the intelligent control can force current from the AC source to be drawn through the rectifier into the load resistor by closing the test switch.

10. The driver of claim 1, further comprising a load resistor in series with a test switch having a control input, the resistor and switch being coupled across the output of the AC source, and in which the intelligent controller further comprises a test output coupled to the control input of the test switch, such that the intelligent control can force current from the AC source to be drawn into the load resistor by closing the test switch.

11. The driver of claim 1 in which the energy storage device is a capacitor.

12. A method of driving a low-power load from an AC power source, using a load driver comprising a rectifier coupled to the output from the AC power source, wherein said AC power source must supply power at at least a first power level in order to operate normally and wherein said low-power load is capable of being powered from said AC power source at a second power level that is below said first power level wherein said rectifier provides a rectified DC output to an energy storage device for storing energy, a controller programmed to gate the DC output of the rectifier, allowing the DC output to store energy in the energy storage device during a gate closed period, and a current source taking energy from the energy storage device and supplying power to the load, the method comprising:
opening the gate for a sufficient percentage of time such that when the gate is closed the load driver presents a load to the AC source that is at least equal to said first power level and such that an average power drawn by said low-power load from said AC power source is equal to said second power level and less than said first power level.

13. The method of claim 12, in which the gate is opened when a charge state of the energy storage device exceeds an upper limit.

14. An electronic apparatus adapted to be powered from an AC power source, wherein said AC power source must supply power at at least a first power level in order to operate normally and wherein said electronic apparatus is capable of being powered from said AC power source at a second power level that is below said first power level;
wherein said electronic apparatus comprises:
a switch adapted to be electrically coupled to said AC power source;
an energy storage device electrically coupled to said switch such that said switch is between said AC power source and said energy storage device;
a load electrically coupled to said energy storage device; and
an intelligent controller coupled to said switch and when said electronic apparatus is operating at said second power level said intelligent controller opens and closes said switch, such that when said switch is closed said electronic apparatus presents a power load to said AC power source that is at least equal to said first power level and wherein said intelligent controller selectively adjusts an open time of said switch such that an average power drawn by said electronic apparatus from said AC power source is equal to said second power level and less than said first power level.

15. The electronic apparatus according to claim 14 further comprising a current source coupled to said energy storage device and said load wherein said energy storage device is coupled to said load through said current source.

16. The electronic apparatus according to claim 14 wherein said intelligent controller is adapted to be coupled to said AC power source, whereby said intelligent controller can monitor at least one parameter related to power received from said AC power source.

17. The electronic apparatus according to claim 16 wherein said intelligent controller monitors a phase of said AC power source and close said switch synchronously with said AC power source.

18. The electronic apparatus according to claim 16 wherein said intelligent controller determines a fraction of an AC waveform from said AC power source that is being cut off and adjusts power delivered to said load based on said fraction of said AC waveform from said source that is being cut off.

19. The electronic apparatus according to claim 16 wherein said intelligent controller alters power delivered to said load.

20. The electronic apparatus according to claim 16 wherein said at least one parameter related to power received from said AC power source is voltage.

21. The electronic apparatus according to claim 16 wherein said intelligent controller is coupled to said energy storage device, and said intelligent controller monitors at least one parameter related to energy stored in said energy storage device.

22. The electronic apparatus according to claim 21 wherein said at least one parameter related to energy stored in said energy storage device is voltage.

23. The electronic apparatus according to claim 22 wherein said energy storage device comprises a capacitor.

24. The electronic apparatus according to claim 23 wherein said intelligent controller closes said switch in response to said voltage reaching a first predetermined voltage level and opens said switch in response to said voltage reaching a second predetermined level.

25. The electronic apparatus according to claim 15 wherein said load comprises at least one LED.

26. An electronic system comprising said AC power source and said electronic apparatus recited in claim 15.

27. The electronic system according to claim 26 wherein said AC power source comprises a triac dimmer.

28. The electronic system according to claim 26 wherein said AC power source comprises an electronic transformer.

29. The method according to claim 12 wherein said gate is opened for at least one AC line pulse.

30. The electronic apparatus according to claim 14 wherein when said electronic apparatus is operating at said second power level said intelligent controller opens said switch for at least one AC line pulse.

* * * * *